Oct. 6, 1970  L. A. VAN GASTEL  3,531,986
DEVICE FOR MEASURING THE TACK OF A PRINTING INK
Filed Dec. 23, 1968
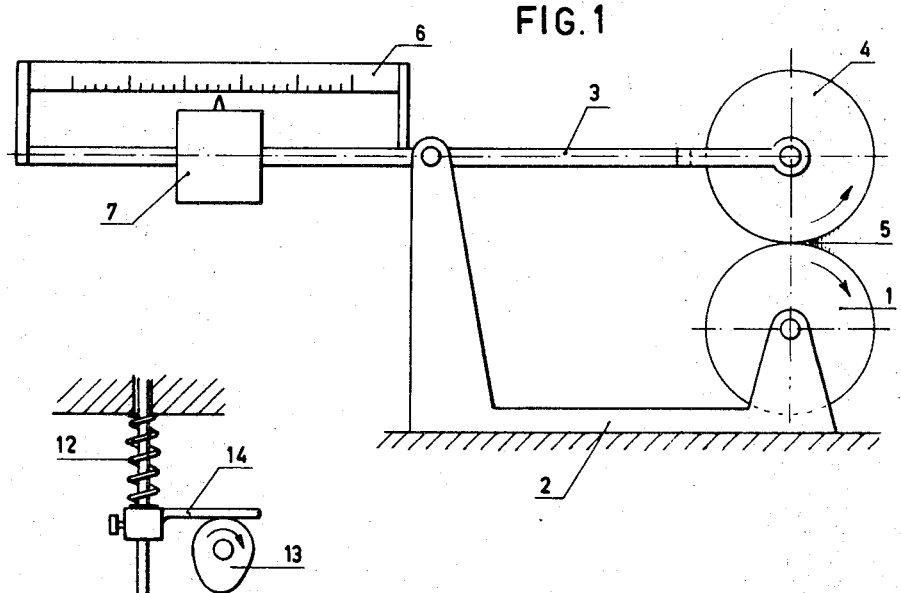
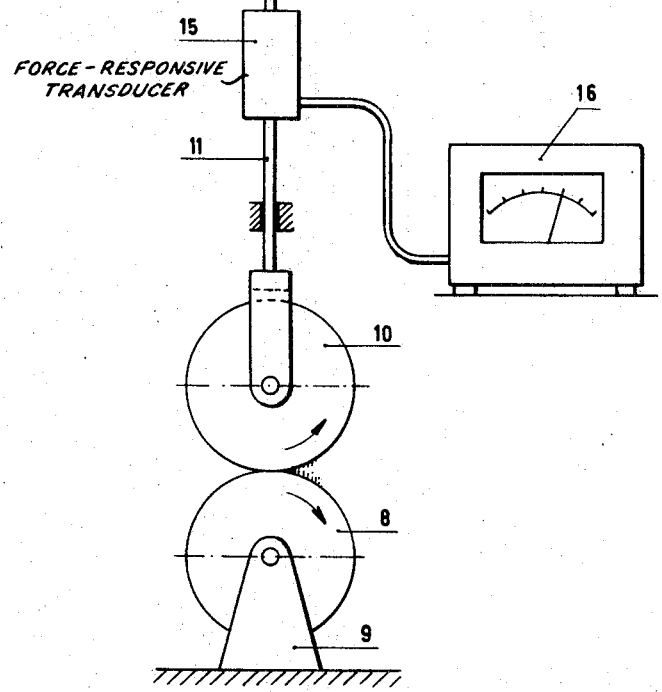
INVENTOR.
Leonard A. Van Gastel
BY
Watson, Cole, Grindle & Watson
Attorneys 3,531,986
DEVICE FOR MEASURING THE TACK OF A PRINTING INK
Leonard A. van Gastel, Nieuw Loosdrecht, Netherlands, assignor to Stichting Instituut voor Grafische Techniek TNO, Amsterdam, Netherlands, a corporation of the Netherlands
Filed Dec. 23, 1968, Ser. No. 785,953
Claims priority, application Netherlands, Jan. 4, 1968, 6800142
Int. Cl. G01n *19/04, 33/26*
U.S. Cl. 73—150      4 Claims

ABSTRACT OF THE DISCLOSURE

A device for measuring the tack of a printing ink or similar viscous substance which measures a force exerted upon at least one of two cylinders being in rotating contact causing the distance between the two shafts of the rotating cylinders to be increased until the ink film splits.

---

The invention relates to an improved device for measuring the tack of a printing ink or similar viscous substance, comprising two bodies rotatable around their shafts, of which the first can be driven directly and the second by friction with the first; an accurately dosed quantity of printer's ink or the like being brought between the two bodies and means having been provided for the exertion of a measured force upon one of the said bodies until the ink film splits.

The tack of, e.g., a printing ink can be defined as a resistance to splitting of a thin ink film, which is demonstrated by the paper's tendency of cohering to a printing form after printing.

The measurement of the tack of a printing ink or the like is based on the measurement of the tensile force that is needed to split an ink film between two solid surfaces which are being displaced with regard to each other.

Besides depending on the geometry of the solid surfaces, this tensile force also depends on the distance between them and the rheological properties of the printing ink.

Devices are known in the art, at which an ink film is brought between two solid surfaces, one of the surfaces being removed from the other practically perpendicularly until the ink film splits.

Admittedly, they have the advantage that the force needed to split the ink film can be measured fairly accurately because it is measured as a component, parallel to the normal; the disadvantage, however, is that it is very difficult always to maintain a small ink film thickness comparable to the practice of printing, causing the results to correlate insufficiently with the requirements to be met by printer's ink and the like in practice.

Further devices are known, where there is an accurately dosed quantity of printer's ink between the surfaces of two rotating bodies, such as cylinders, the first of which is driven directly and the second by friction with the first.

These show the advantage, that, by analogy with the situation existing in a printing press, it is possible to maintain an even thin ink film.

With the aid of existing tack meters of this type the tack is determined by measuring the force needed to displace the two bodies with regard to each other until the ink film splits, all this while maintaining their mutual distance and the rotating contact between each other. The disadvantage is, that a component is measured practically perpendicularly to the normal, causing a great accuracy to be out of the question, whereas mostly the frictions in the bearings have also to be taken into account in the results, in other words this type of apparatus shows insufficient correlation with the requirements of practice.

The object of the invention is to provide a device for measuring the tack of a printing ink or similar viscous substance, the maximum force being measured that makes the ink film or the like split and the measuring results of which device correlating completely with the requirements that the printing ink and the like have to meet in practice.

The device according to the invention is characterized in that both bodies are rotation-symmetrical bodies rotatable around their axes and that means have been provided for the exertion of a measured force upon at least one of the bodies while causing the distance between the shafts of the rotating bodies to be increased until the ink film splits.

The device according to the invention is simple to construct and makes a very handy apparatus that in a simple and quick way can provide the user with the data required.

It can be constructed using any rotation-symmetrical body, though preferably a pair of cylindrically shaped bodies will be applied in view of the simplicity and particularly also the analogy with the rollers in the printing press.

Therefore it is a preferable embodiment that the device comprises a frame with a first rotation-symmetrical body having its bearings fixed in said frame and means for driving this first body; a balance being mounted pivotally in the frame above this body, the one balance arm of which carrying at its end a second rotation-symmetrical body freely rotatable around its shaft, having its bearings in the said end, and which second body can rest upon the first rotation-symmetrical body and can be taken along with friction with the said first body and the other balance arm being provided with a sliding weight, that is displaceable over the balance arm referred to and co-operating with a scale plate in such a way that on displacement of said weight, during the rotating contact between the two bodies, the second rotation-symmetrical body, which is driven by friction can be lifted from the directly driven first rotation-symmetrical body until the ink film splits.

It is also possible to lift the said second body which is driven by fraction with the said first body by fitting the former on the end of a rod that can be displaced against the action of a compression spring and which rod has been provided with a transducer.

In that case the device is characterized by a frame with, having its bearings fixed in it, a directly driven first rotation-symmetrical body, and by a rod guided in the frame and movable against the action of a compression spring; a second rotation-symmetrical body, freely rotatable around its shaft, which second body has its bearings in a yoke at the end of said rod and which body can rest against the directly driven first rotation-symmetrical body and then can be taken along by friction with the said first body, the rod being fitted with a transducer connected with a measuring device, as well as provided with an arm co-operating with a pivotable cam, in such a way that during the rotating contact the second rotation-symmetrical body taken along by friction can be lifted from the directly driven first rotation-symmetrical body, until the ink film splits.

Further these devices show the advantage, that they may temporarily or permanently be built into a printing press, the function of the directly driven rotation-symmetrical body being performed by the ink roller in the printing press. Consequently such an embodiment is characterized in that the directly driven first rotation-symmetrical body is the ink roller in a printing press.

By making adjustabe the speed with which both the rotating bodies are removed from each other, it is possible to evaluate much better and more accurately the visco-elastic performance of the printing ink or the like, which is very important for practical purposes.

The invention will further be elucidated below with reference to the drawings, in which by way of example some embodiments are shown schematically; in it.

FIG. 1 shows a device for determining the tack with the aid of a balance with sliding weight;

FIG. 2 a device for determining this tack with the aid of a rod, movable against the action of a compression spring, which rod has been fitted with a transducer.

In the device shown in FIG. 1 cylinder 1, which is directly driven by a motor that is not shown on the drawing, has its bearings fixed in a frame 2. In the frame, above this cylinder 1, a balance 3 has its bearings, with at the end of the one arm a cylinder 4 freely rotable around its shaft, which cylinder rests upon the directly driven cylinder 1. Between the two cylinders 1 and 4 there is brought a dosed quantity of printer's ink or the like 5, The other arm of the balance has been provided with a scale plate 6, alongside which can be moved a sliding weight 7, displaceable over the said arm.

In the device shown in FIG. 2 a cylinder 8, directly driven by a motor that is not shown in the drawing, has its bearings fixed in a frame 9. Cylinder 10 freely rotatable around its shaft, has its bearings in a yoke 17 at the end of a rod 11, which is movable against the action of a compression spring 12 by means of a lifter 13, cooperating with a cam 14 mounted on rod 11.

The rod 11 has been fitted with a transducer 15, for measuring forces in a way known in the art, which is connected with a suitable indicating device 16.

What is claimed is:

1. An improved device for measuring the tack of a printing ink of the type comprising two bodies mounted substantially vertically one above the other and rotatable around their respective axes, of which the first body can be driven directly and the second body is driven by friction with the said first body, an accurately dosed quantity of printers' ink or the like being introduced between the two bodies; and means for the exertion of a measured force upon one of the said bodies to lift it from the other so as to split the ink film; both said bodies being rotation-symmetrical bodies; and means being provided for measuring the maximum force exerted at the moment the ink film splits.

2. An improved device for measuring the tack of a printing ink according to claim 1 comprising a frame (2) with a first one of the rotation-symmetrical bodies (1) having its bearings fixed in the frame and means for driving this first body, a balance (3) mounted pivotably in the frame (2) above said first body (1), one balance arm of which carries at its end the second rotation-symmetrical body (4) mounted freely rotatable around a shaft which has its bearings fixed in the said end in such a way that said second body (4) can rest upon the first rotation-symmetrical body (1) and can be driven by friction with the said first body and the second balance arm being provided with a sliding weight (7), displaceable over the said second balance arm and cooperating with a scale plate (6) in such a way that on displacement of said weight during the rotating contact between the two bodies, the second rotation-symmetrical body (4), while being driven by friction, can be lifted from the first rotation-symmetrical body (1).

3. An improved device for measuring the tack of a printing ink according to claim 1 comprising a frame (9) with the directly driven first rotation-symmetrical body (8) having its bearings fixed in said frame and a rod (11) guided in the frame and mounted to be movable against the action of a compression spring (12) and the second rotation-symmetrical body (10) freely rotatable around a shaft having its bearings mounted to the end of said rod (11) in such a way that said second body (10) can rest against the said first rotation-symmetrical body (8) and can be driven by friction with said first body, the rod being fitted with a force responsive transducer (15), as well as provided with an arm (14) cooperating with a pivotable cam (13) in such a way that pivoting of the cam during the rotating contact between said two bodies causes the second rotation-symmetrical body (10) to be lifted from the said first rotation-symmetrical body (8).

4. A device according to claim 1, wherein the directly driven first rotation-symmetrical body is the ink roller in a printing press.

References Cited

UNITED STATES PATENTS 2,101,322  12/1937  Reed _____ 73—150 XR
2,993,371   7/1961  Greubel _____ 73—150

LOUIS R. PRINCE, Primary Examiner

F. SHOON, Assistant Examiner